(12) United States Patent
McTigue

(10) Patent No.: US 8,976,029 B1
(45) Date of Patent: *Mar. 10, 2015

(54) PRODUCT MANAGEMENT SYSTEM

(71) Applicant: Annette Cote McTigue, New Windsor, NY (US)

(72) Inventor: Annette Cote McTigue, New Windsor, NY (US)

(*) Notice: Subject to any disclaimer, the term of this patent is extended or adjusted under 35 U.S.C. 154(b) by 267 days.

This patent is subject to a terminal disclaimer.

(21) Appl. No.: 13/633,958

(22) Filed: Oct. 3, 2012

Related U.S. Application Data

(63) Continuation-in-part of application No. 12/171,242, filed on Jul. 10, 2008, now Pat. No. 8,284,056.

(51) Int. Cl.
  *G08B 13/14* (2006.01)
(52) U.S. Cl.
  USPC .......... 340/572.1; 340/426.33; 340/442; 340/505; 340/539.1; 340/540; 340/572.7; 340/572.8; 340/612; 340/613; 340/10.1; 235/378; 235/379; 235/380; 235/381; 235/382; 235/383; 235/384; 235/385

(58) Field of Classification Search
  None
  See application file for complete search history.

(56) References Cited

U.S. PATENT DOCUMENTS

| | | | | |
|---|---|---|---|---|
| 2002/0161652 | A1* | 10/2002 | Paullin et al. | 705/22 |
| 2010/0032437 | A1* | 2/2010 | Lossau | 220/694 |
| 2011/0095891 | A1* | 4/2011 | Fenkanyn | 340/572.7 |

* cited by examiner

*Primary Examiner* — Curtis King
(74) *Attorney, Agent, or Firm* — Law Offices of Ira D. Blecker, P.C.

(57) ABSTRACT

A system of managing product at a location in which a weight-sensing RFID tag is utilized to determine the weight or pressure applied to a substrate and then this information is read by an RFID reader and then transmitted to a data storage repository and processing program for further handling of the data. The data storage repository and processing program may be near the RFID reader or may be remotely located with respect to the RFID reader.

20 Claims, 6 Drawing Sheets

PRODUCT MANAGEMENT SYSTEM

RELATED APPLICATION

This application is a continuation in part of U.S. patent application Ser. No. 12/171,242, filed Oct. 9, 2012, entitled "Product Management System and Method of Managing Product at a Location", the disclosure of which is incorporated by reference herein.

BACKGROUND OF THE INVENTION

The present invention relates to a product management system and, more particularly, to a product management system in which radio frequency identification (RFID) tag technology is utilized to monitor and report the amount of product left in a container or to monitor weight or pressure with respect to a product.

An RFID tag is an object that can be applied to or incorporated into a product for the purpose of identification using radio waves. The RFID tag can be read remotely by an RFID reader without contacting the RFID tag.

Most RFID tags contain at least two parts. One part is an integrated circuit for storing and processing information, modulating and demodulating an RF signal, and other specialized functions. The second part is an antenna for receiving and transmitting the signal.

Today, a significant thrust in RFID use is in enterprise supply chain management whereby the efficiency of inventory tracking and management of the supply chain are improved.

It would be desirable to improve the art of using RFID for inventory management by identifying and/or tracking the contents of product containers and the amount of product left in those product containers. For example, products that are sold through supermarkets, such as milk, baby formula, laundry soap, medicines, personal care items, and the like, are consumed regularly, and often the inventory of those products can be depleted by the consumer prior to acquiring additional inventory from the supermarket. Consequently, a state of need and/or discomfort is experienced due to the delay in replacing products and often the need to minimize replacement time increases replacement cost. It is often critical to plan product replacement in advance of need in order to avoid the state of need and/or discomfort, as well as, to minimize replacement cost.

It would be desirable to have a product management system which can function at a low operating cost and with a high degree of convenience. Components of the proposed system need to provide the product management function and yet be low cost to the point of being disposable in order to be cost effective enough to be incorporated into everyday packaging and/or products.

Various solutions have been proposed for product management.

Chishima et al. U.S. Patent Application Publication No. US2006/0119484, the disclosure of which is incorporated by reference herein, discloses in FIG. 2 a weight sensor for determining the weight of the contents in a container. A radio reading device in the lid of the container reads the RFID tag on the package which is to be inserted in the container. Chishima et al. further discloses in FIGS. 5 and 6, a transmitter and receiver for estimating the remaining amount of liquid in the container by transmitting radio waves from the transmitter in the top of the container to the receiver in the bottom of the container and then measuring the attenuation of the radio waves to result in an estimation of the amount of liquid left in the container. The transmitter and receiver may be driven by an RFID tag (transmission device) on the side of the container.

Newman U.S. Pat. No. 4,254,482, the disclosure of which is incorporated by reference herein, discloses in FIG. 1 an echolocation arrangement in which a transducer 16 emits and receives sound waves in order to determine the level of a flowing liquid or of material level in a closed container.

Schackmuth et al. U.S. Patent Application Publication No. US2007/0254080, the disclosure of which is incorporated by reference herein, discloses an inventory management system for a restaurant in which a plurality of food items are placed on a tray and the weight of the tray is monitored by a weight sensor and further an RFID tag is attached to the tray to provide information on the type and quantity of food items on the tray. The trays may be temporarily stored in a food holding cabinet which may contain an RFID interrogator (reader) for reading data from the RFID tag.

The use of RFID tags attached to products is quite common for the purposes of inventory tracking, product expiration, product identification and so on. However, there does not appear to be any attempt to utilize RFID tags to internally monitor the loose contents or fill level of the product container.

BRIEF SUMMARY OF THE INVENTION

The advantages of the present invention have been achieved by providing, according to a first embodiment of the present invention, a product management system comprising:

a container;

a radio frequency identification (RFID) reader located a distance from the container;

a weight-sensing RFID tag wholly contained within a bottom portion of the container, the RFID tag providing information regarding the weight of a quantity of a product in the container, the weight-sensing RFID tag being an integrated package comprising an antenna, an integrated circuit, at least two layers or films, and an elastic structure separating the at least two layers or films, the at least two layers of films and elastic structure cooperating to determine the weight of product in the container by the elastic structure physically changing the at least two layers of film relative to the weight of product in the container, wherein responsive to receiving a signal from the RFID reader, the antenna transmits a signal to the RFID reader that is indicative of the separation of the at least two layers or films which, in turn, is indicative of the weight of product in the container;

wherein, in operation, the RFID reader transmits a signal to the RFID tag and responsive to the signal, the RFID tag transmits information to the RFID reader regarding the weight of a quantity of product in the container, the RFID reader receiving the information from the weight-sensing RFID tag to determine the weight of a quantity of product in the container.

According to a second embodiment of the present invention, there is provided a product management system comprising:

a container;

a radio frequency identification (RFID) reader located a distance from the container;

a weight-sensing RFID tag wholly contained within a bottom portion of the container, the RFID tag providing information regarding the weight of a quantity of a product in the container, the weight-sensing RFID tag being an integrated package comprising an antenna, an integrated circuit, at least two layers or films, and a flexible structure separating the at least two layers or films, wherein the at least two layers of films, flexible structure and antenna cooperating to determine the weight of product in the container by the flexible structure physically changing the at least two layers of film relative to the weight of product in the container and physically changing the shape of the antenna, and wherein responsive to receiving a signal from the RFID reader, the antenna transmits a signal having a frequency to the RFID reader such that the frequency of the transmitted signal by the antenna is indicative of a change in shape of the antenna which, in turn, is indicative of the weight of product in the container;

wherein, in operation, the RFID reader transmits a signal to the RFID tag and responsive to the signal, the RFID tag transmits information to the RFID reader regarding the weight of a quantity of product in the container, the RFID reader receiving the information from the weight-sensing RFID tag to determine the weight of a quantity of product in the container.

According to a third embodiment of the invention, there is provided a product management system comprising:

a substrate;

a radio frequency identification (RFID) reader located a distance from the substrate;

a weight-sensing RFID tag on or against the substrate, the RFID tag providing information regarding a weight or pressure applied to the substrate, the weight-sensing RFID tag being an integrated package comprising an antenna, an integrated circuit, at least two layers or films, and a flexible structure separating the at least two layers or films, wherein the at least two layers of films, flexible structure and antenna cooperating to determine the weight or pressure applied to the substrate by the flexible structure physically changing the at least two layers of film relative to the weight or pressure applied to the product and physically changing the shape of the antenna, and wherein responsive to receiving a signal from the RFID reader, the antenna transmits a signal having a frequency to the RFID reader such that the frequency of the transmitted signal by the antenna is indicative of a change in shape of the antenna which, in turn, is indicative of the weight or pressure applied to the substrate;

wherein, in operation, the RFID reader transmits a signal to the RFID tag and responsive to the signal, the RFID tag transmits information to the RFID reader regarding the weight or pressure applied to the substrate, the RFID reader receiving the information from the weight-sensing RFID tag to determine the weight or pressure applied to the substrate.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
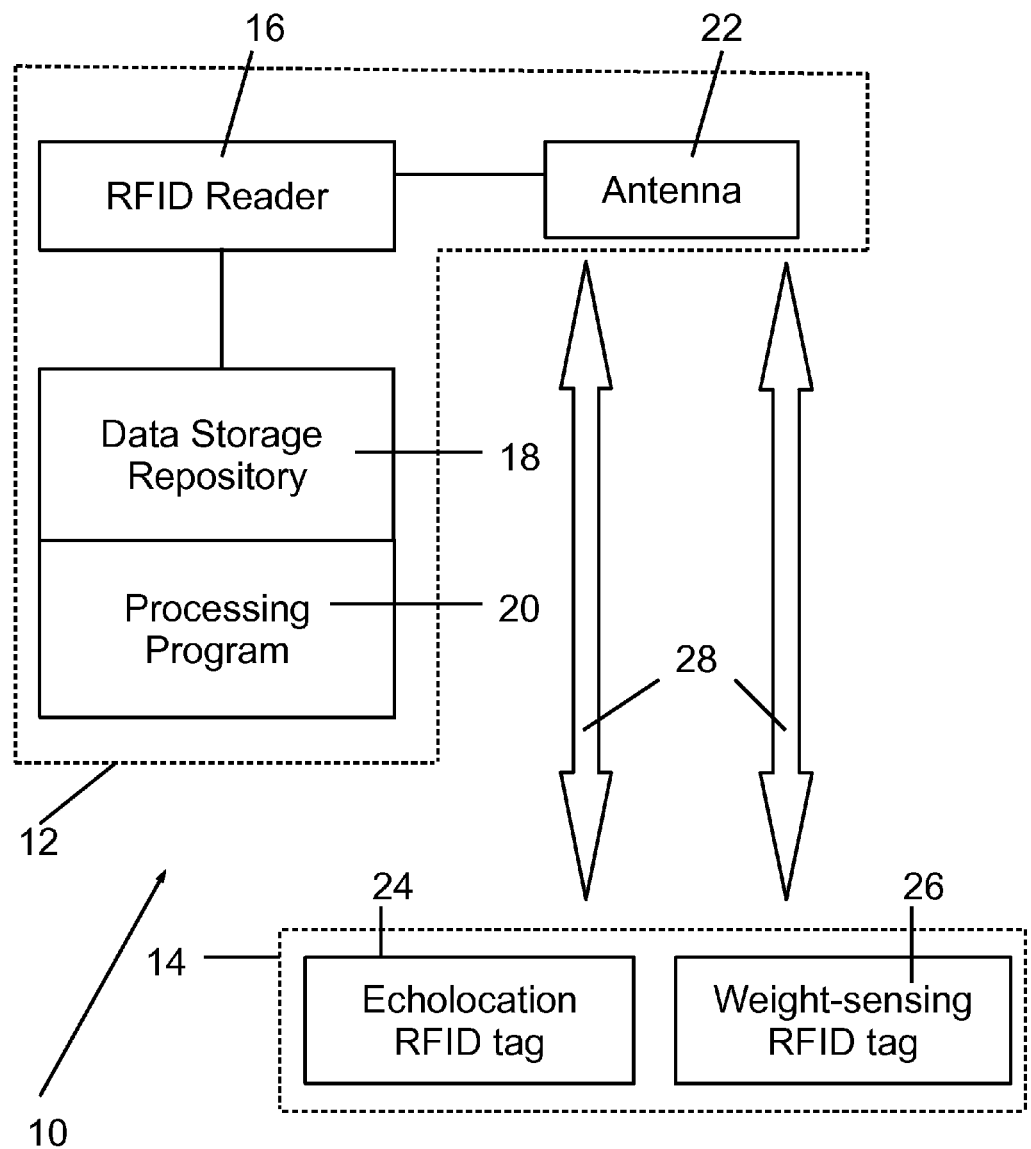
FIG. 1 is a block diagram of the product management system according to the present invention.

Referring to the drawings in more detail, and particularly referring to FIG. 1, there is shown a block diagram of the product management system 10 according to the present invention. The product management system includes a first portion 12 and a separate second portion 14. First portion 12 includes a radio frequency identification (RFID) reader 16, sometimes called an interrogator, a data storage repository 18 for storing data about the product and data with respect to information received by the RFID reader 16 and a processing program 20 for processing information about the product and in particular for processing information (for example, measurements collected by an RFID tag (discussed below)) received by the RFID reader 16. The processing program 20 also contains information about the attributes of the products and use of the products, parameters of the container that stores or holds the product and expected volume, density and weight of the product. The RFID reader would also have an antenna 22 for wirelessly communicating 28 with at least one RFID tag.

Second portion 14 includes at least one RFID tag. In one preferred embodiment, the RFID tag is an echolocation RFID tag 24. In another preferred embodiment, the RFID tag is a weight-sensing RFID tag 26. In yet another preferred embodiment, the RFID tag is both an echolocation RFID tag 24 and weight-sensing RFID tag 26.

The product management system according to the present invention is particularly suitable for determining the quantity of product in a container. In this regard, the RFID tag 24 and/or 26 would be situated within a container (not shown in FIG. 1) and provide information to the RFID reader 16 about the quantity of material within the container. RFID reader 16 would be situated apart from the RFID tag 24, 26 such as in a cabinet.

The RFID reader 16 would be connected, either wired or wirelessly, to the data storage repository 18 and processing program 20. The RFID reader 16 need not be near the data storage repository 18 and processing program 20 and, in fact, may connect to the data storage repository 18 and processing program 20 through the internet, phone line or some other medium. In one preferred embodiment of the invention, RFID tag 24, 26 would be located on product in a location along with the RFID reader 16. As an example, the location could be a consumer's home. The RFID reader 16 may be owned by the consumer (or location owner) or, in another preferred embodiment of the invention, could be leased from or otherwise provided by another entity such as a supplier of the product, a shopping service or a restocking provider.

The data storage 18 and processing program 20 could also be located at the location in the one preferred embodiment of the invention. As an example, the data storage repository 18 and processing program 20 could be located on a computer owned by the consumer at the location.

In the other preferred embodiment of the invention, the data storage repository 18 and processing program 20 are located remotely at the other entity mentioned above such as a supplier of the product, a shopping service or a restocking provider. In this embodiment of the invention, the entity could monitor the consumer's use of the product and provide various information (as described in more detail below) to the consumer with respect to the product. Further, the entity may even provide restocking of the product when it detects that the product in the consumer's location is getting depleted.

Figure 4:
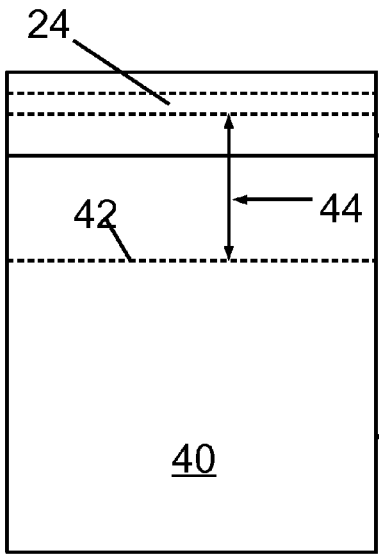
FIG. 4 is a schematical view of a preferred embodiment of a container having an echolocation RFID tag.

Referring now to FIG. 4, one preferred embodiment of the present invention includes a container 30 having a lid 32 and echolocation RFID tag 24 would be situated within the lid 32. The container 30 and lid 32 are exemplary only and the form of the container and lid may take any of several forms. Thus, container 30 and lid 32 could be a jar or a bottle. The container 30 may also take the form of a container like a milk carton or box where there is no lid at all. The echolocation RFID tag 24 would preferably be mounted above the contents 40 of the container 30 and potentially in a cap, lid or even embedded in the container 30.

The echolocation RFID tag 24 will have the ability to receive and direct RF incoming signal from RFID reader antenna 22 into a container 30 and then capture the RF signal reflection or echo from the contents 40 within the container 30. The RFID reader 16 receives information from the echolocation RFID tag 24 to determine a distance 44 from the echolocation RFID tag 24 to the level of the product 42 and then correlates the distance determined 44 to a quantity or volume of product in the container 30. The signal reflection strength and possibly the time required to reflect from within container 30 among other captured data points will be used to determine the current container contents level 42 in concert with container parameters stored in the data storage repository 18. The echolocation RFID tag 24 may also have the capability to determine the ambient temperature and then forward that information to the RFID reader 16 when interrogated by the RFID reader 16.

The echolocation RFID tag 24 will have the ability to store data such as product relevant information which may include the Electronic Product Code (EPC code), production information (manufacturing date, location, lot number, expiration date, etc.) but at a minimum, the echolocation RFID tag 24 will store data that can uniquely identify the container 30 to the data storage repository 18. This product relevant data in conjunction with the product level 42 enables the product management system 10 the ability to accurately determine the remaining quantity of product within container 30.

Figure 2:
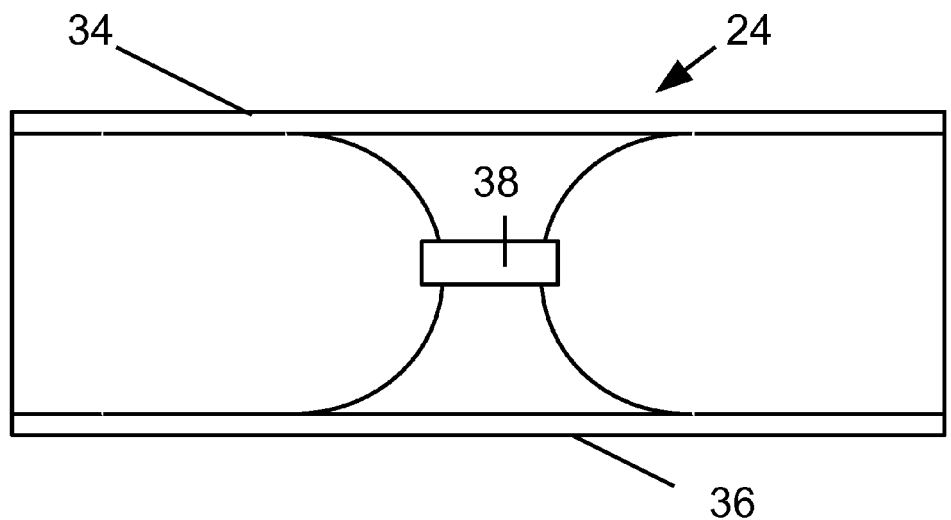
FIG. 2 is an enlarged schematical view of an echolocation tag according to the present invention.

Referring now to FIG. 2, the echolocation RFID tag 24 is shown in more detail. Echolocation RFID tag 24 has an externally facing antenna 34 and an internally facing antenna 36 which faces the contents 40 of the container 30 as shown in FIG. 4. The externally facing antenna 34 would receive an incoming RF signal from the RFID reader antenna 22. The incoming signal can be varied in duration, frequency, strength, or other signal attribute. The incoming signal is channeled through the echolocation RFID tag antenna 34 into the integrated circuit 38. The integrated circuit 38 could be located at the approximate midpoint between the externally facing antenna 34 and the internally facing antenna 36. The three components would possibly form the shape of an hourglass. The incoming RF signal's energy will excite the integrated circuit 38. The RF signal could be modified or modulated by the integrated circuit 38, if desired, and then be directed into the container 30 through the internally facing antenna 36 toward the contents 40 or the bottom of the container 30. The reflected or echoed signal from the contents 40 or bottom of the container 30 will then be captured by the internally facing antenna 36. The reflected signal(s) would then "collect" the stored data from the already energized integrated circuit 38. The energized integrated circuit 38 can modify or modulate the outbound signal(s), if desired, prior to transmitting all the data through the externally facing antenna 34 back to the RFID reader's antenna 22. The returned data has been changed in a measured manner through which the container contents level 42 can be derived by the processing program 20.

As an example, the time from transmitting the signal internally in the container 30 to when it is reflected back from the container contents level 42 to the internally facing antenna 36 is measured. The container contents level 42 will be determined through echo of the radio signals which are directed into the container 30. The echoed frequency signals reflected back from the contents of or the bottom of the container which is captured by the internally facing antenna 36 will contain the data relevant to the processing program 20. Subsequently, the returned backscattered signals to the RFID reader's antenna 22 can be modified or modulated by either the integrated circuit 38 or through interaction with the contents 40 of the container 30. This modification or modulation will be used by the processing program 20 to determine the container contents level 42. All data is transmitted to the data storage repository 18 for further calculations based on the expected container volume and content density by the processing program 20.

Figure 5:
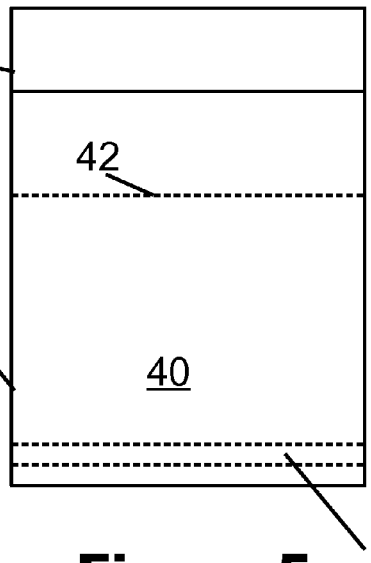
FIG. 5 is a schematical view of a preferred embodiment of a container having a weight-sensing RFID tag.

Referring now to FIG. 5, another preferred embodiment of the present invention includes a weight-sensing RFID tag 26 in the container 30 having a lid 32.

In some cases, the contents 40 of container 30 may have settled, possibly during shipping, or the composition or shape of the contents 40 within container 30 may indicate that weight is a more accurate means of measuring the quantity of the contents 40 of the container 30 rather the level 42 of the contents 40 measured by the echolocation RFID tag 24.

The weight sensing RFID tag 26 consists of an antenna 46, integrated circuit 38, and at least two layers or films 48, 50 that are separated by a flexible structure 52 which exerts pressure against the contents 40 of the container 30. As the container 30 empties and weight decreases the pressure against the flexible structure 52 also decreases which allows the flexible structure 52 to physically change the two layers or films 48, 50 in a measured manner relative to the weight of the contents 40 in the container 30.

The weight-sensing RFID tag 26 will have the ability to store data such as product relevant information which may include the Electronic Product Code (EPC code), production information (manufacturing date, location, lot number, expiration date, etc.) but at a minimum, the weight-sensing RFID tag 26 will store data that can uniquely identify the container 30 to the data storage repository 18. This product relevant data in conjunction with the weight of the container contents 40 enables the product management system 10 the ability to accurately determine the remaining quantity of product within container 30.

A managed container 30 is filled to the expected capacity and the appropriate weight-sensing RFID tag 26 designed for that container is properly applied. The weight-sensing tag's two layers or films 48, 50 are separated by the flexible structure 52 which applies counter pressure to the container's content weight. This approach of coordinating the correctly calibrated weight-sensing RFID tag 26 with a container's expected capability allows the upper and lower layers or films 48, 50 respectively, to be completely joined when the proper weight of the contents 40 is applied on top of the weight-sensing RFID tag 26. As the container 30 empties, the flexible structure 52 would exert pressure that would begin to separate the two layers or films 48, 50. Once all the weight is removed, the two layers or films 48, 50 would be fully separated. As the two layers or films 48, 50 separate, the returned RF signal transmitted through the weight-sensing RFID tag antenna 46 is changed in a measured way so the new weight of the contents 40 within the container 30 can be calculated by the processing program 20. One implementation of this embodiment of the invention would be as the layers or films 48, 50 separate, the antenna length and/or shape is physically changed which will change the frequencies that are sent and received by that antenna 46.

Figure 3:
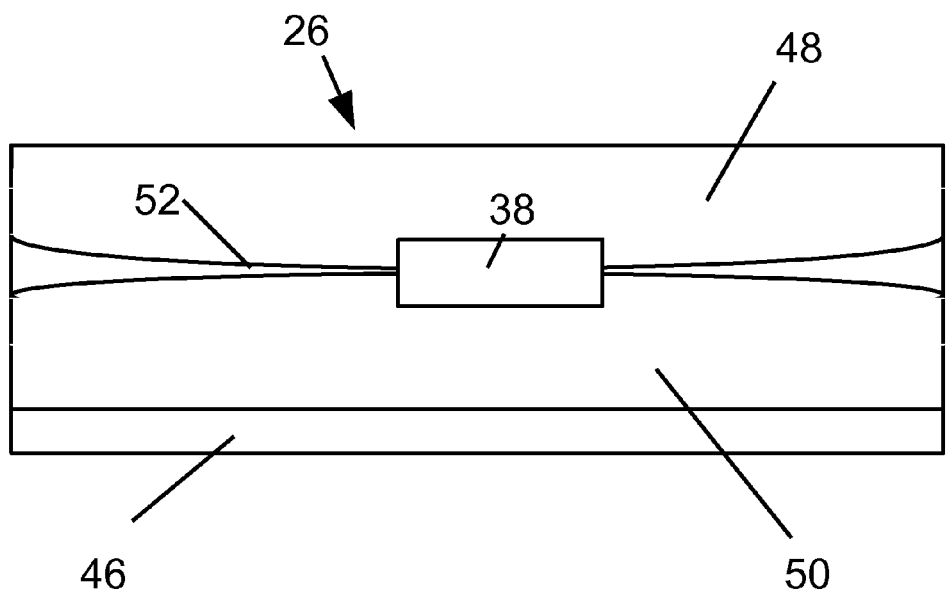
FIG. 3 is an enlarged schematical view of a weight-sensing RFID tag according to the present invention.
Figure 8A:
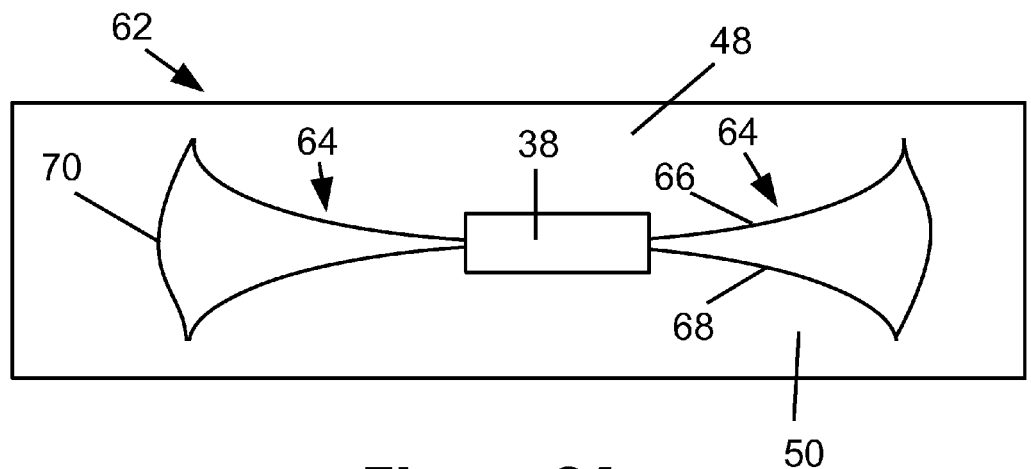
FIG. 8A is an enlarged schematical view of another embodiment of a weight-sensing RFID tag according to the present invention with no weight applied and FIG. 8B is the weight-sensing RFID tag with a weight applied.
Figure 8B:
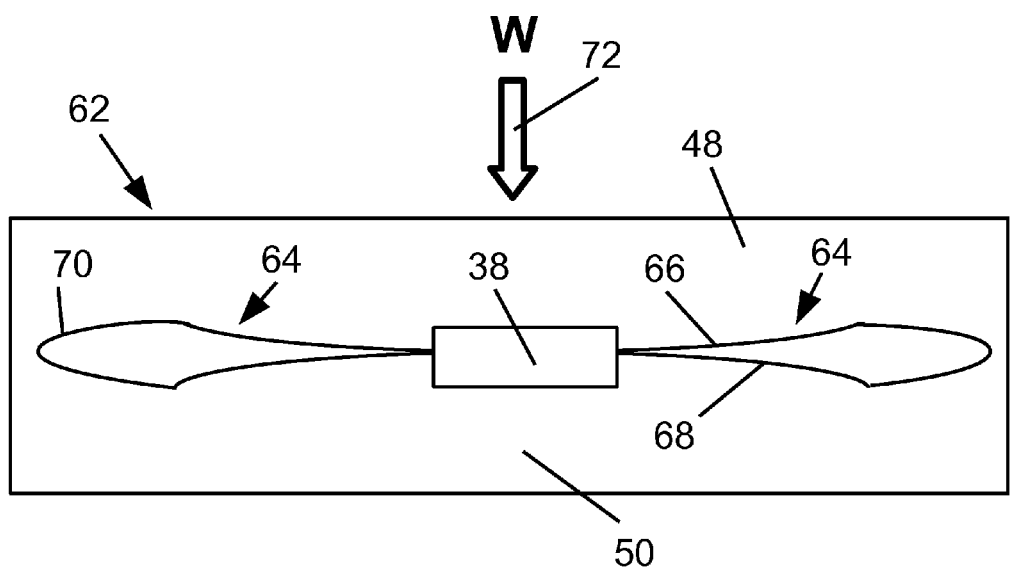

Referring to FIGS. 8A and 8B there is an alternative embodiment of a weight-sensing RFID tag. Referring first to FIG. 8A, weight-sensing RFID tag 62 includes an integrated circuit 38 and at least two layers of films 48, 50, similar to weight-sensing RFID tag 26 in FIG. 3. Weight-sensing RFID tag 62 includes antenna 64 having arms 66, 68 and end piece 70. The arms 66, 68 extend from integrated circuit 38. Arms 66, 68 and end piece 70 of antenna 64 may in cooperation with integrated circuit 38 form a circuit so that in one embodiment, the integrated circuit 38 may impart a signal to the antenna 64 which changes in frequency depending on the shape of the antenna 64. The weight-sensing RFID tag 62 in FIG. 8A has no weight applied to it so arms 66, 68 are spaced wide apart. In FIG. 8B, a quantity of product, indicated by "W" 72, is applied to the weight-sensing RFID tag 64. The antenna 64 is made of a flexible material, preferably metallic, such as a spring so that the antenna 64 can elastically flex when a quantity of product is applied and return to its original shape when the quantity of product is removed. When the product is applied, the arms 66, 68 of antenna 64 become compressed together to narrow the gap between them and as a consequence, end piece 70 bulges outwardly. The shape of the antenna 64 will vary in a measured way in accordance with the weight of product applied to the weight-sensing RFID tag 62 and hence, in one embodiment, the frequencies transmitted by the antenna 64 will likewise vary in accordance with the weight of product applied to the weight-sensing RFID tag 62. When the antenna 64 changes shape in accordance with the weight of the product applied to the weight-sensing RFID tag 62, the frequencies that may be sent by the antenna 64 or read by the RFID reader 16 responsive to the weight applied will change and this frequency change will be processed by the RFID reader 16.

Figure 9:
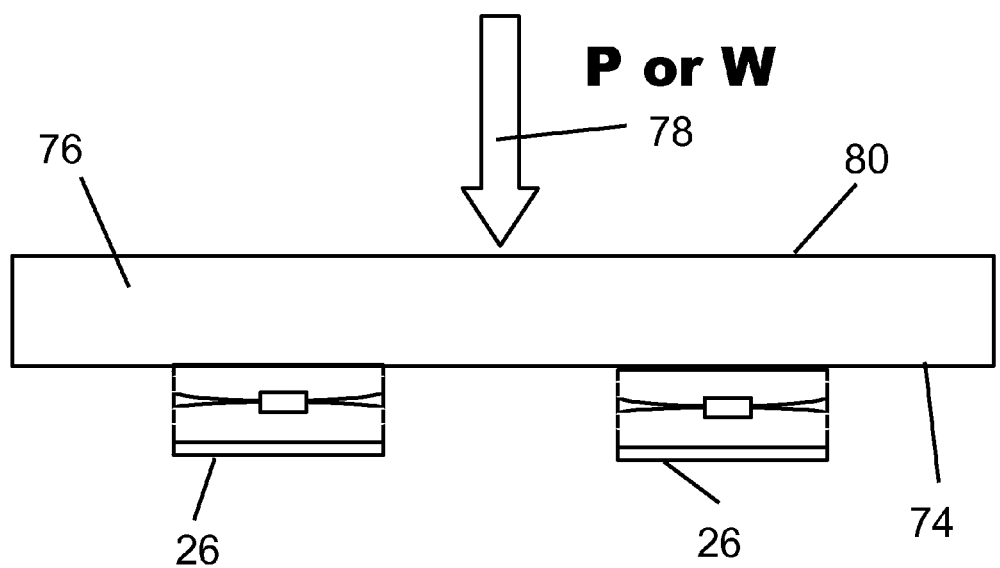
FIG. 9 is a schematical view of a weight-sensing tag on a surface of a product to measure weight or pressure on the product.

Referring to FIG. 9 there is shown a further exemplary embodiment in which a weight-sensing RFID tag 26 or 62 is used to sense weight or pressure applied to a substrate. Either of the weight-sensing tags 26, or 62 shown in FIGS. 3 and 8A-8B may be used in this exemplary embodiment. For purposes of illustration, weight-sensing tag 26 is shown in FIG. 9. As shown in FIG. 9, at least one RFID weight-sensing tag 26 is placed on or against a surface 74 of a substrate 76. There may be more than one RFID weight-sensing tag 26, such as the two weight-sensing tags 26 shown in FIG. 9, which may be determined by the size of the substrate 76. When a pressure or weight 78 is applied against substrate 76, the at least one RFID tag 26 senses the pressure or weight 78 and when the RFID tag 26 is interrogated by an RFID reader 16 (FIG. 1), the pressure or weight applied to surface 80 is transmitted to the RFID reader 16. The weight-sensing tab 26 may be placed on or against the surface 74 that is opposite from the surface 80 to which the pressure or weight 78 is applied.

There are a multitude of uses for the exemplary embodiment of FIG. 9. The weight-sensing RFID tag 26, 62 may be placed under a welcome mat or similar surface to trigger an event such as turning on a light or sound an alarm. Another potential application is to place the weight-sensing RFID tag 26, 62 under a waste disposal can or bin so that the weight-sensing RFID tag may determine when the weight of the waste in the can or bin has reached a predetermined weight indicating the waste can or bin needs to be emptied. A further implementation of the weight-sensing RFID tag 26, 62 could be placed between two surfaces to measure when those two surfaces move toward or away from each other. An example would be to signal an open window or door when the weight-sensing RFID tag 26, 62 is compressed in a closed window or door. In the event the window or door is opened, the weight-sensing RFID tag 26, 62 will no longer have the weight pressed on it and can signal the window or door has been opened. The RFID weight-sensing tags 26, 62 may aid in enforcing weight limits and safety in the transportation industry. The RFID weight-sensing tag(s) 26, 62 may be built into or placed under a truck's container area. The weight-sensing RFID tag(s) 26, 62 may transmit the weight of the truck's container area at a truck weigh station or be linked to toll road payment systems, such as, EZpass.

In the exemplary embodiment of FIG. 9, the weight or pressure may be applied only for a short period of time, such as stepping on a doormat, so the rigidity of the flexible structure of the weight-sensing tag 26, 62 may be calibrated to the tag's purpose and/or to the expected weight or pressure to be measured. The speed at which the flexible structure compresses or decompresses may be manipulated to optimize successful RFID read rate is the compression/decompression event is less than the frequency at which the weight-sensing RFID tag 26, 62 is read.

Figure 6:
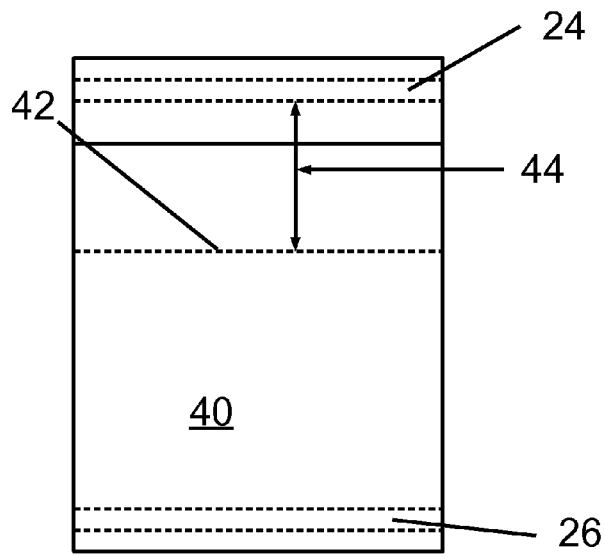
FIG. 6 is a schematical view of a preferred embodiment of a container having an echolocation RFID tag and a weight-sensing RFID tag.

Referring now to FIG. 6, another preferred embodiment of the present invention includes an echolocation RFID tag 24 and a weight-sensing RFID tag 26 in the container 30 having a lid 32.

Under certain circumstances, it would be desirable to obtain information about the weight and the volume of the contents 40 of the container 30. In these circumstances, both types of RFID tags 24, 26 could be added to the container as shown in FIG. 6.

Information Applicable to all Embodiments of the Invention

The container 30 to which the RFID tag 24, 26 is attached can potentially be part of everyday packaging. For the echolocation RFID tag 24, the container can be optimized to maximize the internal echo quality through the use of internal coating material or through the container composition itself.

The RFID tag 24, 26 can be a passive, active or semi-passive device. A passive RFID tag has no internal power supply. The minute electrical current induced in the antenna by the incoming radio frequency signal provides just enough power for the integrated circuit in the RFID tag to power up and transmit a response. Most passive RFID tags signal by backscattering the carrier wave from the RFID reader which means that the antenna has to be designed both to collect power from the incoming signal and also to transmit the outbound backscatter signal.

Active RFID tags have their own internal power source, which is used to power the integrated circuits and to broadcast the response signal to the RFID reader. Active RFID tags, due to their on board power supply, may transmit at higher power levels than passive RFID tags. However, active RFID tags are generally bigger, caused by battery volume, and more expensive to manufacture, caused by battery price.

Semi-passive RFID tags, also called semi-active RFID tags, are similar to active RFID tags in that they have their own power source, but the battery only powers the integrated circuit and does not power the broadcasting of a signal. The response is usually powered by means of backscattering the RF energy from the RFID reader. Semi-passive RFID tags are advantageous in that they have greater sensitivity than passive RFID tags, have longer battery life than active RFID tags and can perform active functions under its own power, even when no RFID reader is present for powering the integrated circuit.

The present invention proposes the use of passive RFID tags to achieve distance and weight measurements in order to achieve lower cost requirements. It is contemplated that a particularly preferred use of the present invention will be for use in consumer packaging. Thus, cost and simplicity are paramount and so passive RFID tags would be ideal. However, other preferred uses of the invention could be in industrial applications wherein it is necessary to know with some accuracy the remaining contents of barrels, bins and large containers. For these latter applications, active or semi-passive RFID tags could be a more suitable alternative.

The RFID tag 24, 26 of the present invention would have the ability to be erased, if desired, by using an RF signal at a specified frequency or strength or as a tamper resistant/quality control mechanism. In one scenario, the predetermined frequency or strength would cause the integrated circuit 38 within the echolocation RFID tag 24 or weight-sensing RFID tag 26 to erase any unique identifiers such as EPC code or the like that are also stored in the data storage repository 18. This would prevent the data storage repository 18 from properly identifying and managing the container 30. A unique identification number, possible hard-coded into the RFID tag 24, 26, would stay resident in the integrated circuit 38 with no reference in the data storage repository 18. The unique number, that was not erased, would allow the de-activated RFID tag 24, 26 to be re-activated if desired. The RFID Reader 16 can also be used to program the data store information in the RFID tag's integrated circuit 38 to re-identify the RFID tag 24, 26 to the data storage repository 18 by matching the unique identification number in the RFID tag 24, 26 to a product or container parameter in the data storage repository 18.

The RFID tag 24, 26 could have erase functionality, as a tamper resistant/quality control mechanism, which would be useful in cases where containers should only be opened in authorized physical areas. In such cases, the authorized physical areas would also be an RFID interrogation area. If a container were to be opened up outside an authorized RFID interrogation area then the unique identifiers in the integrated circuit 38 would be set to erase. As described above, this would cause the integrated circuit 38 within the RFID tag to erase any unique identifiers such as EPC code or the like that are also stored in the data storage repository 18 which would prevent the data storage repository 18 from properly recognizing the container which would signal potential unauthorized opening of the container. In the event the RFID tag 24, 26 is erased but needs to be re-initialized, the unique identification number, that was not erased and is potentially hard coded, would allow the de-activated RFID tag 24, 26 to be re-activated if desired. An authorized RFID reader 16 could be used to re-program the data store information in the RFID tag's integrated circuit 38 to re-identify the tag to the data storage repository 18 by matching the unique identification number in the RFID tag 24, 26 to a product or container parameter in the data storage repository 18.

As noted above, RFID reader 16 could be located in a cabinet apart from the RFID tag 24, 26. This cabinet could be, for example, a refrigerator. The cabinet could also be located in the same room or a different room as the RFID tag 24, 26 or could also be located in a storage room. A light socket either in the refrigerator, room, or other storage area could act as the power source and/or trigger for the RFID reader 16 to interrogate or read the RFID tags 24, 26 in the area. The RFID tag 24, 26 can also detect ambient temperature and transmit this information to the data storage repository 18. The ambient temperature of the container 30 may affect the density of the contents 40 and should be included in the calculations of the weight or volume that are run by the processing program 20.

Figure 7:
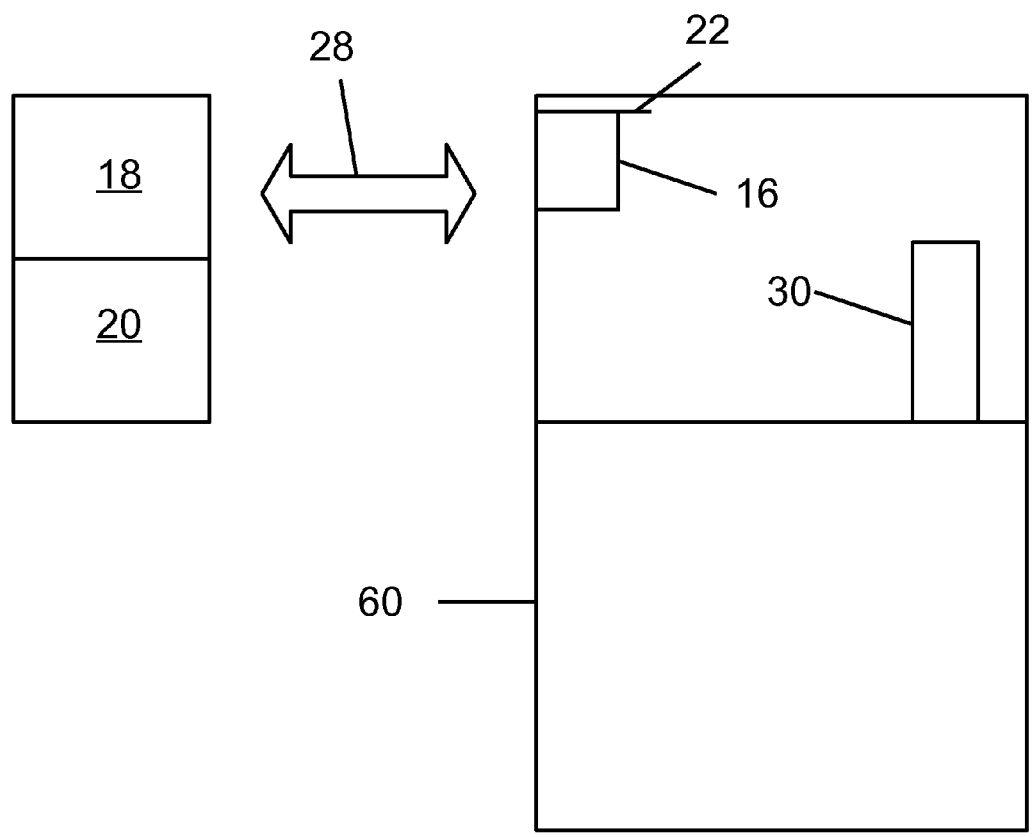
FIG. 7 is a schematical view of a preferred embodiment of a container having an RFID tag stored in a cabinet which communicates with a remotely located data storage repository and processing program.

One preferred embodiment of the present invention is shown in FIG. 7. Container 30 having an RFID tag 24, 26 (not shown in FIG. 7) is stored in a cabinet which in FIG. 7 is refrigerator 60. RFID reader 16 having antenna 22 is also contained within the refrigerator 60. Data storage repository 18 and processing program 20 are remotely located from refrigerator 60. The RFID reader 16 wirelessly communicates 28 through a communication device (such as a radio, cell phone, etc.) with the remotely located data storage repository 18 and processing program 20. The communication is two-way so that the data storage repository 18 and processing program 20 can also communicate with the RFID reader 16.

A further option is to auto light the area where the containers 30 are stored based on motion detection for improved visibility and to trigger an RF scan of the containers 30. As an example, when a person would reach their hand into or open a cabinet (for example, a refrigerator), the RFID reader 16 would be triggered to send RF signals to the RFID tag 24, 26 to begin the process of obtaining the weight or volume of the contents 40 of the container 30. The area could also be lighted wherein the color of the light may change if physical interaction is required for safety reasons or any other reason.

The processing program 20 processes attributes of the product as well as use of the product. Thus, the processing program 20 may per a defined time window monitor use of the product when the container 30 is out of its normal scan area (for example, in the refrigerator) and in use elsewhere (for example, on the kitchen table. Other examples of use of the processing program 20:

Monitor low and high days of supply to determine a re-order point;

Calculate historical usage including upcoming relevant planned events (i.e. vacation) to project a window for restocking;

Calculate average quantity of product used during each event;

Do a spoil/freshness analysis;

Recommend actions based on data received from the RFID tag 24, 26—such data may include EPC, manufacturing date, location, expiration date, recalls, warranty, etc.;

Detect and track waste. I.e., based on product consumption patterns, the processing program 20 has the ability to recommend, "right sized" packages based on usage and/or price point;

Report on other consumption patterns such as seasonal product, day of the week consumption patterns, etc.; and Prepare budget and planning reports to the consumer.

The processing program may also have a brand loyalty management function. Thus, a customer can assign brand loyalty ratings to managed products from a 1-10 range:

1—I only want this product at best available price;

5—I am flexible on brand but want to make alternate selections myself; and

10—This product is a pure commodity to me and similar product will do.

Brand loyalty ratings of 5 or greater are an opportunity for the consumer to optimize price and special offers. Ranges of 5 or greater, allow product companies opportunities to extend special offers to the consumer that are interested in their product. It creates marketing opportunities for vendors but only through the shopping service provider.

Consistent brand loyalty less than 5 can earn brand loyalty credit that the consumer can use for future benefit encouraging the consumer's continued loyalty. The supplier's or vendor's support of the brand loyalty credit system can encourage consumers to become product advocates through referrals or by increasing loyal consumer credit based on supplier/vendor product success.

The data storage repository 18 could consist of enormous amounts of data in regards to consumers, products, geographies, other demographics, and effectiveness of the product Company's marketing/special offers.

Consumers will need to opt in to the shopping service provider's method that will drive price/product competitiveness to the benefit of the consumer. The shopping service provider:

Can recommend a meal plan based on available ingredients;

Can manage dietary guidance; and

Can recommend recipes or even full meal packages.

In addition to the shopping provider, there could also be a restocking provider. The restocking provider is a group that coordinates and manages the transactions between the suppliers/vendors and the end product consumers. This service is not limited to a geographic footprint of stores as the distribution hubs or direct supplier/vendor distribution methods will be the key.

The restocking provider would also provide a means for the consumer to manually shop or reorder products that aren't part of the RFID scanning areas through a handheld or manual entry method directly into the processing program 20 and the data storage repository 20.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

The invention claimed is:

1. A product management system comprising:
a container;
a radio frequency identification (RFID) reader located a distance from the container;
a weight-sensing RFID tag wholly contained within a bottom portion of the container, the RFID tag providing information regarding a weight of a quantity of a product in the container, the weight-sensing RFID tag being an integrated package comprising an antenna, an integrated circuit, at least two layers or films, and an elastic structure separating the at least two layers or films, the at least two layers of films and elastic structure cooperating to determine the weight of product in the container by the elastic structure physically changing the at least two layers of film relative to the weight of product in the container, wherein responsive to receiving a signal from the RFID reader, the antenna transmits a signal to the RFID reader that is indicative of the separation of the at least two layers or films which, in turn, is indicative of the weight of product in the container;
wherein, in operation, the RFID reader transmits a signal to the RFID tag and responsive to the signal, the RFID tag transmits information to the RFID reader regarding the weight of a quantity of product in the container, the RFID reader receiving the information from the weight-sensing RFID tag to determine the weight of a quantity of product in the container.

2. The product management system of claim 1 wherein the elastic structure is a spring.

3. The product management system of claim 1 wherein the elastic structure comprises a pair of elastic arms with one arm in each of the two layers or films such that when no weight is applied to the weight-sensing RFID tag, the elastic arms are apart and when a quantity of product is applied to the weight-sensing RFID tag, the arms move closer together, indicative of the weight of the product applied to the weight-sensing RFID tag.

4. The product management system of claim 3 wherein the pair of elastic arms extend from the integrated circuit.

5. The product management system of claim 4 further comprising a second pair of elastic arms that extend from the integrated circuit.

6. The product management system of claim 1 further comprising:
a communication device for transmitting the quantity of product information from the RFID reader to a remote location; and
a processing program for processing the quantity of product information received by the RFID reader.

7. A product management system comprising:
a container;
a radio frequency identification (RFID) reader located a distance from the container;
a weight-sensing RFID tag wholly contained within a bottom portion of the container, the RFID tag providing information regarding a weight of a quantity of a product in the container, the weight-sensing RFID tag being an integrated package comprising an antenna, an integrated circuit, at least two layers or films, and a flexible structure separating the at least two layers or films, wherein the at least two layers of films, flexible structure and antenna cooperating to determine the weight of product in the container by the flexible structure physically changing the at least two layers of film relative to the weight of product in the container and physically changing a shape of the antenna, and wherein responsive to receiving a signal from the RFID reader, the antenna transmits a signal having a frequency to the RFID reader such that the frequency of the transmitted signal by the antenna is indicative of the change in shape of the antenna which, in turn, is indicative of the weight of product in the container;
wherein, in operation, the RFID reader transmits a signal to the RFID tag and responsive to the signal, the RFID tag transmits information to the RFID reader regarding the weight of a quantity of product in the container, the RFID reader receiving the information from the weight-sensing RFID tag to determine the weight of a quantity of product in the container.

8. The product management system of claim 7 wherein the flexible structure is a spring.

9. The product management system of claim 7 wherein the flexible structure is a metallic and elastic structure.

10. The product management system of claim 7 wherein the flexible structure is the antenna.

11. The product management system of claim 9 wherein the elastic structure comprises a pair of elastic arms with one arm in each of the two layers or films such that when no weight is applied to the weight-sensing RFID tag, the elastic arms are apart and when a quantity of product is applied to the weight-sensing RFID tag, the arms move closer together, indicative of the weight of the product applied to the weight-sensing RFID tag.

12. The product management system of claim 11 wherein the pair of elastic arms extend from the integrated circuit.

13. The product management system of claim 12 further comprising a second pair of elastic arms that extend from the integrated circuit.

14. The product management system of claim 7 further comprising:
 a communication device for transmitting the quantity of product information from the RFID reader to a remote location; and
 a processing program for processing the quantity of product information received by the RFID reader.

15. A product management system comprising:
 a substrate;
 a radio frequency identification (RFID) reader located a distance from the substrate;
 a weight-sensing RFID tag on or against the substrate, the RFID tag providing information regarding a weight or pressure applied to the substrate, the weight-sensing RFID tag being an integrated package comprising an antenna, an integrated circuit, at least two layers or films, and a flexible structure separating the at least two layers or films, wherein the at least two layers of films, flexible structure and antenna cooperating to determine the weight or pressure applied to the substrate by the flexible structure physically changing the at least two layers of film relative to the weight or pressure applied to the product and physically changing a shape of the antenna, and wherein responsive to receiving a signal from the RFID reader, the antenna transmits a signal having a frequency to the RFID reader such that the frequency of the transmitted signal by the antenna is indicative of the change in shape of the antenna which, in turn, is indicative of the weight or pressure applied to the substrate;
 wherein, in operation, the RFID reader transmits a signal to the RFID tag and responsive to the signal, the RFID tag transmits information to the RFID reader regarding the weight or pressure applied to the substrate, the RFID reader receiving the information from the weight-sensing RFID tag to determine the weight or pressure applied to the substrate.

16. The product management system of claim 15 wherein the flexible structure is a spring.

17. The product management system of claim 15 wherein the flexible structure is a metallic and elastic structure.

18. The product management system of claim 15 wherein the flexible structure is the antenna.

19. The product management system of claim 17 wherein the elastic structure comprises a pair of elastic arms with one arm in each of the two layers or films such that when no weight or pressure is applied to the weight-sensing RFID tag through the substrate, the elastic arms are apart and when a weight or pressure is applied to the weight-sensing RFID tag through the substrate, the arms move closer together, indicative of the weight or pressure applied to the weight-sensing RFID tag through the substrate.

20. The product management system of claim 19 wherein the pair of elastic arms extend from the integrated circuit.

* * * * *